(12) United States Patent
Cope et al.

(10) Patent No.: US 8,504,097 B1
(45) Date of Patent: Aug. 6, 2013

(54) ALTERNATIVE HARDWARE AND SOFTWARE CONFIGURATION FOR NEAR FIELD COMMUNICATION

(75) Inventors: Warren B. Cope, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/463,797

(22) Filed: May 3, 2012

(51) Int. Cl.
  *H04M 1/00* (2006.01)

(52) U.S. Cl.
  USPC ...... 455/550.1; 455/41.1; 455/41.2; 713/186; 713/182

(58) Field of Classification Search
  USPC .................. 455/41.1, 41.2, 550.1; 713/186, 713/182
  See application file for complete search history.

(56) References Cited

U.S. PATENT DOCUMENTS

| | | | | |
|---|---|---|---|---|
| 6,668,322 | B1 * | 12/2003 | Wood et al. | 713/182 |
| 6,895,234 | B1 * | 5/2005 | Laursen et al. | 455/403 |
| 8,238,823 | B2 * | 8/2012 | Maugars et al. | 455/41.1 |
| 2006/0224901 | A1 * | 10/2006 | Lowe | 713/186 |
| 2007/0177771 | A1 * | 8/2007 | Tanaka et al. | 382/115 |
| 2007/0197261 | A1 * | 8/2007 | Humbel | 455/558 |
| 2008/0014867 | A1 * | 1/2008 | Finn | 455/41.1 |
| 2008/0188178 | A1 * | 8/2008 | Maugars et al. | 455/41.1 |
| 2010/0052844 | A1 * | 3/2010 | Wesby | 340/5.7 |
| 2010/0162028 | A1 * | 6/2010 | Frank et al. | 714/2 |
| 2011/0035604 | A1 * | 2/2011 | Habraken | 713/193 |

OTHER PUBLICATIONS

Cope, Warren B., et al., "Electronic Purchase Transaction Trust Infrastructure", filed May 29, 2012, U.S. Appl. No. 13/482,731.
Cope, Warren B., et al., "Multiple Secure Elements in Mobile Electronic Device with Near Field Communication Capability", filed Apr. 5, 2012, U.S. Appl. No. 13/440,980.
FAIPP Pre-Interview Communication dated Oct. 24, 2012, U.S. Appl. No. 13/463,801, filed May 3, 2012.
Bye, Stephen James, et al., "Near Field Communication Authentication and Validation to Access Corporate Data", filed May 3, 2012, U.S. Appl. No. 13/463,801.

* cited by examiner

*Primary Examiner* — Charles Shedrick

(57) ABSTRACT

A system on a mobile phone for configuring a secure partition in a trusted security zone is provided. The system comprises a processor and a near field communication transceiver. The processor executes virtualization software and comprises a first virtual processor and a second virtual processor, where the second virtual processor comprises the trusted security zone and the secure partition resides in the trusted security zone. The first virtual processor comprises an application which utilizes the secure partition in the trusted security zone. The second virtual processor comprises an application stored in the trusted security zone, where the application couples the near field communication transceiver to the secure partition residing in the trusted security zone and where the application enables run-time execution in the trusted security zone based on the receiving a signal from the near field communication transceiver.

19 Claims, 6 Drawing Sheets

US 8,504,097 B1

ALTERNATIVE HARDWARE AND SOFTWARE CONFIGURATION FOR NEAR FIELD COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near field communication (NFC) refers to short-range wireless radio communication between two devices, typically occurring over distances no more than a few centimeters. NFC radio communication may be used for financial transactions such as completing a payment transaction from a mobile phone encapsulating an electronic credit card and/or debit card to a point-of-sale (POS) terminal. NFC radio communication may be used to provide personal identification and/or to electronically access physical spaces, for example to provide a student identification, an employee identification, a medical identification; to activate a badge reader to unlock an entry door; to access a hotel room; to access a rental car. NFC radio communication may be used for communicating content such as reading explanatory information from an NFC tag coupled to a placard in a museum or in a retail display.

A secure element (SE) is a combination of hardware, software, interfaces, and protocols that enable the secure storage and usage of credentials for payments, authentication and other services. Secure elements promote security in these service processes. Secure elements typically reside on an embedded hardware semiconductor chip in a mobile device, in a removable memory card that holds an embedded chip which can be used as a secure partition, and in a universal integrated circuit card (UICC), which is typically used to authenticate a mobile device to a mobile network.

SUMMARY

In an embodiment, a system on a mobile phone for configuring a secure partition in a trusted security zone is disclosed. The system comprises a processor and a near field communication transceiver. The processor executes virtualization software and comprises a first virtual processor and a second virtual processor, where the second virtual processor comprises the trusted security zone and the secure partition resides in the trusted security zone. The first virtual processor comprises an application which utilizes the secure partition in the trusted security zone. The second virtual processor comprises an application stored in the trusted security zone, where the application couples the near field communication transceiver to the secure partition residing in the trusted security zone and where the application enables run-time execution in the trusted security zone based on the receiving a signal from the near field communication transceiver.

In an embodiment, a method of secure partition configuration in a trusted security zone on a mobile device is disclosed. The method comprises selecting in a first application on a mobile device a secure partition from a plurality of secure partitions concurrently residing in the trusted security zone on the mobile device. The selection of the secure partition from the first application is sent to a second application, where the second application is stored in the trusted security zone on the mobile device. A near field communication transceiver in the mobile device is coupled to the selected secure partition, where the second application executes to perform the coupling and where the secure partition hardware and software reside on the processor of the mobile device in the trusted security zone. A wireless link between the near field communication transceiver in the mobile device and an external near field communication device is established, where the wireless link enables communication between the selected secure partition and the external near field communication device.

In an embodiment, a system on a mobile phone for configuring a secure partition in a trusted security zone is disclosed. The system comprises a processor and a near field communication receiver. The processor executes virtualization software and comprises a plurality of processing cores, a first virtual processor, and a second virtual processor, where the second virtual processor comprises the trusted security zone. The first virtual processor comprises an application which utilizes the secure partition in the trusted security zone. The second virtual processor comprises an application stored in the trusted security zone, where the application couples the near field communication transceiver to the secure partition residing in the trusted security zone via a first processing core of the plurality of processing cores.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
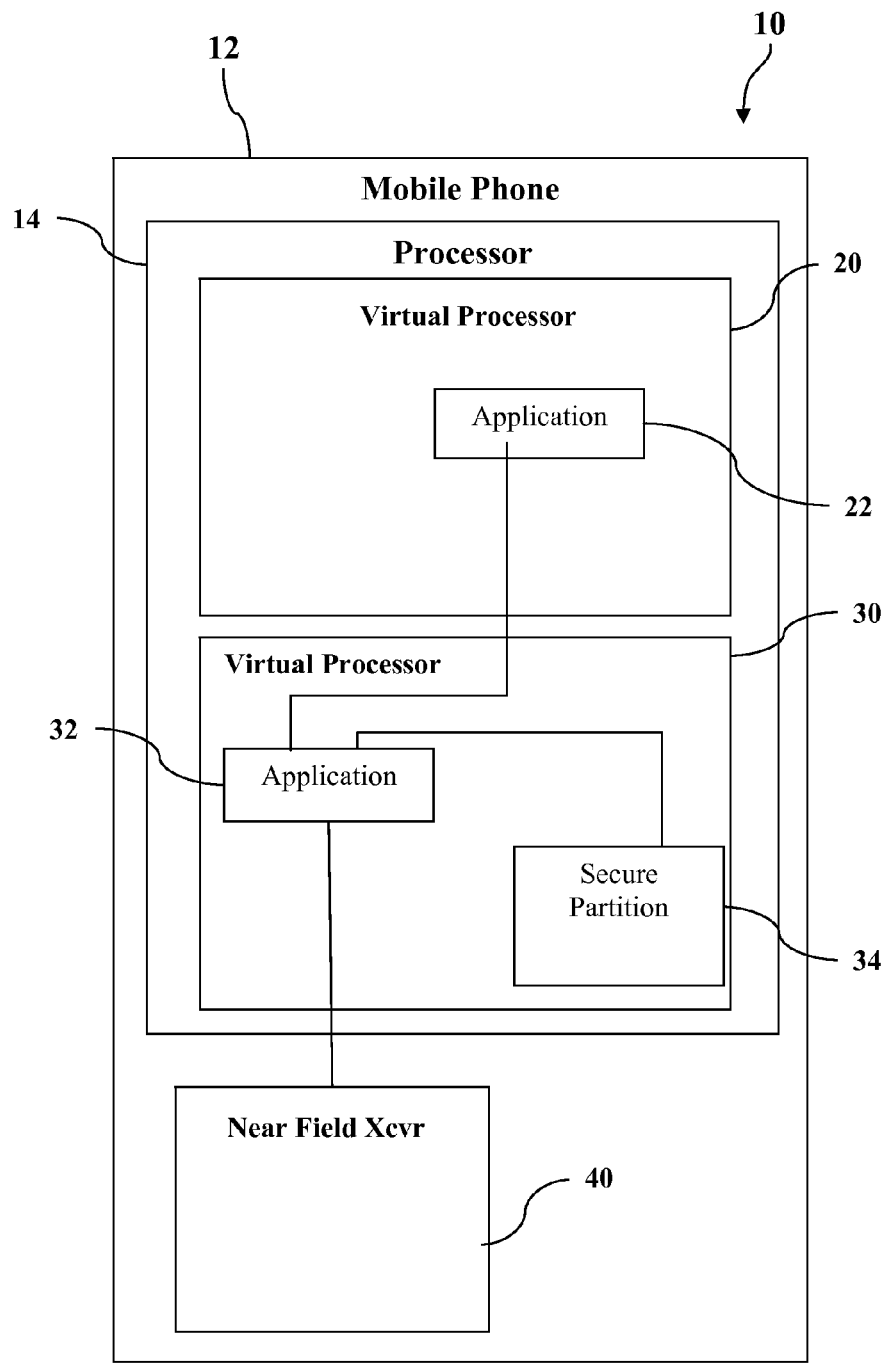
FIG. 1 is a block diagram of a system on a mobile phone for configuring a secure partition in a trusted security zone according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Near field communication (NFC) allows for transactions, data exchange, and wireless connections between two devices in proximity to each other. Technology based on near field communication specifications may be used in a mobile phone or similar mobile device to enable users to make mobile payments with the mobile phone. A secure element (SE) component in the mobile phone is designed to only allow trusted programs on the secure element itself access to the data and payment credentials stored therein. The secure element and the near field communication transceiver are typically coupled to accommodate the timing specifications for initiating a near field communication session and to ensure the security of data for mobile financial transactions. Due to this linked nature of the secure element and the near field communication transceiver in the mobile phone, in the past only one secure element has commonly been supported in the mobile phone. Furthermore, the secure element typically resides on a separate hardware chip within the mobile phone, providing security through the software and hardware architecture of the secure element chip.

The present disclosure teaches a system and method for a secure partition configuration in a trusted security zone on the mobile phone. The system provides the ability to utilize a trusted security zone architecture built into the main processor chipset of the mobile phone to implement the secure element functionality without the separate secure element chip.

Hardware logic ensures that no secure partition resources can be accessed by the normal partition components or applications. In an embodiment, isolation of normal partition components and/or applications may be provided by excluding the processor or processors associated with the normal partition from asserting the address or addresses needed to access secure partition resources, for example requiring a bit be asserted to read or write a data bus that the normal world processor or processors are unable to assert. In an embodiment, while the trust zone is executing, the normal partition components may be excluded from accessing any input/output peripherals such as keyboards, touchscreens, pushbuttons, interface ports, sensors, radio transceivers, or transducers. While the trust zone is executing, the normal partition components may be excluded from accessing an accelerometer, a global positioning system (GPS) receiver, a disk drive reader/writer. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

The trusted security zone may be implemented by partitioning the hardware and software resources of the mobile device to exist in a secure subsystem which is not accessible to components outside the secure subsystem. The trusted security zone runs a dedicated secure operating system in a virtual processor separate from the primary mobile device operating system that likewise executes in its own virtual processor. The secure operating system is not accessible to the mobile device users. Placing the trusted security zone in the secure partition and restricting access from the primary mobile device operating system protects against software and basic hardware attacks.

The trusted security zone allows not only simplified hardware design through the elimination of the secure element chip, but greater flexibility in the configuration and use of the secure partition. Typically a single secure element is supported on a mobile phone due to the security chain required to initialize the secure element chip, where only the original provider of the secure key has access and control over the secure partition. Utilizing the trusted security zone to provide the secure element functionality allows the mobile phone manufacturer or service provider to allocate the necessary processor and memory resources to support multiple secure partitions while still maintaining the security chain required for mobile financial services and other secure transactions. Additionally, standards-based protocols may be used to securely add new secure partitions, configure existing secure partitions, and wipe or delete secure partitions no longer in use via wireless, over-the-air updates.

The near field communication transceiver may interface with the secure partitions through a direct connection to a hardware port on the mobile device processor. To couple the trusted security zone to the near field communication transceiver while preventing access to the data outside of the trusted security zone, the near field communication transceiver may be coupled to the hardware port on the mobile device processor. When applications are running in the trusted security zone, the hardware port is not accessible outside of the trusted security zone. Applications running in the trusted security zone execute at run-time to accept the data on the hardware port, authenticate access to the secure partition, and deliver the data to the secure partition. Secure partitions provide the secure storage for data and programs for implementing mobile financial services. Programs in the secure partition execute to process the data and communicate back to the near field communication transceiver to complete the transaction. Supported services may include mobile banking and payment services, electronic ticketing, electronic identification and other wireless mobile transactions needing secure interfaces.

In an embodiment, a trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming mainstream features in mobile device chipsets. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete Trusted Execution Environment (TEE) may be implemented through the use of the trusted security zone hardware and software architecture. The Trusted Execution Environment is an execution environment that is parallel to the execution environment of the main mobile device operating system. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as sensors, medical devices, point-of-sale terminals, industrial automation, handheld terminals, automotive, etc.

The trusted security zone may be implemented by partitioning all of the hardware and software resources of the mobile device into two partitions: a secure partition and a normal partition. In some contexts, the secure partition may be referred to as a secure world or a secure execution world and the normal partition may be referred to as a non-secure world or a non-secure execution world. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone may be implemented by partitioning the hardware and software resources to exist in a secure subsystem which is not accessible to components outside the secure subsystem. The trusted security zone is built into the processor architecture through hardware logic present in the trusted security zone which enables a perimeter boundary between the secure partition and the normal partition. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications may run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors may context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the mobile device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks.

Turning now to FIG. 1, a system 10 on a mobile phone for configuring a secure partition in a trusted security zone is described. The system 10 comprises mobile phone 12 comprising a processor 14 and a near field communication transceiver 40. The processor 14 executes virtualization software and comprises a first virtual processor 20 and a second virtual processor 30, where the second virtual processor 30 comprises the trusted security zone and a secure partition 34 resides in the trusted security zone. The first virtual processor 20 executes an application 22 which utilizes the secure partition 34 in the trusted security zone. The second virtual processor 30 comprises an application 32 stored in a trusted security zone, where the application enables run-time execution in the trusted security zone based on receiving a signal from the near field communication transceiver 40.

The near field communication transceiver 40 allows for secure transactions, data exchange, and wireless connections with other near field communication devices such as a contactless point-of-sale terminal or identification reader, enabling communication with devices in close proximity. The secure partition 34 comprises data and programs in the trusted security zone designed to protect the data from access by non-secure programs as well as hacking attacks and malware programs. The secure partition 34 may store credentials and data used for mobile financial services, identification documents, and electronic ticketing accessible only to trusted programs stored on the secure partition 34 itself.

In an embodiment, the application 32 couples the near field communication transceiver 40 to the secure partition 34 residing in the trusted security zone. For example, the first application 22 may be an electronic wallet application which utilizes the secure partition 34 to view account information for a credit card to be used for a mobile payment. The application 32 receives the selection and couples the selected secure partition 34 to the near field communication transceiver 40. The mobile phone is now ready to establish a near field communication link with an external device such as a contactless point-of-sale terminal and make a secure mobile payment using the credit card credentials from the selected secure partition 34.

In an embodiment, the trusted security zone utilizes security extensions implemented in a System on Chip (SoC) architecture. A system on chip is an integrated circuit (IC) that integrates all components of a computer or other electronic system into a single chip. The system on chip architecture may be implemented using digital signal processors (DSPs) or a reduced instruction set computer (RISC) architecture such as an Advanced Reduced Instruction Set Computer Machine (ARM) architecture. ARM processors run rich operating systems and applications while providing a low power design suitable for high performance but power efficient mobile phones. The trusted security zone technology is tightly integrated with the ARM processor in a system wide approach to security suitable for applications such as secure mobile payments. The trusted security zone is built into the processor architecture and may be provided through a dedicated secure kernel running independent secure applications which can be accessed by normal applications through the trusted security zone application programming interface (API).

In an embodiment, the first virtual processor and the second virtual processor execute in a time-sliced fashion. The security of the system is achieved by partitioning the hardware and software resources of the mobile phone so they exist in one of two worlds, a normal world running on the first virtual processor and the secure world running on the second virtual processor. Both virtual processors may run on a single physical processor to safely and efficiently execute code in a time-sliced fashion, removing the need for a dedicated physical security processor. Time-sliced execution comprises switching contexts between the two virtual processors to share processor resources based on tightly controlled mechanisms such as secure software instructions or hardware exceptions. The state of the currently running virtual processor is saved and the state of the virtual processor that is being switched to is restored and processing is resumed in the restored virtual processor.

In an embodiment, coupling the near field communication transceiver 40 to the selected secure partition 34 comprises coupling the near field communication transceiver 40 to a hardware port of the processor where the hardware port is monitored by the application 32 for interfacing with the secure partition. The near field communication transceiver is coupled to the hardware port of the processor via the Single Wire Protocol, creating a secure, well defined data path between the near field communication transceiver 40 and the processor 14. The second application executes on the processor 14 in the trusted security zone to monitor the hardware port and transfer the received data to the secure partition in the trusted security zone.

In an embodiment, the application 32 executes at the ring 0 protection level which provides the most privileges and most direct interaction with the physical hardware. Hierarchical protection domains, or rings, are a mechanism to provide fault tolerance and security in software architecture. A protection ring is one of two or more hierarchical levels of privilege within the computer operating system, with gating access between rings providing security by preventing programs from one ring from misusing resources intended for programs in another. Ring 0 is typically reserved for kernel code and device drivers, and executing the application 32 at ring 0 allows it to directly access the hardware port on the processor 14 to receive data from the near field communication transceiver 40 while protecting the data from being accessed by programs with lower privilege.

In an embodiment, the system 10 further comprises a plurality of secure partitions residing in the trusted security zone. Providing multiple secure partitions in the trusted security zone allows for secure data from different sources and for disparate uses to be maintained on the mobile phone. For example, there may be a secure partition containing data including credit card information to support a mobile banking application, another secure partition supporting a mobile ticketing application, and a third secure partition with student identification information. Each individual secure partition retains the secure storage and execution environment to support their respective services while maintaining the security chain required by the service providers.

In an embodiment, the application 32 stored in the trusted security zone couples the near field communication transceiver to a second secure partition based on receiving a selection of the second secure partition from the application stored in the first virtual processor. Having a plurality of secure partitions provides the ability to have multiple secure mobile services on a single mobile phone. Because of timing constraints involved in mobile financial transactions utilizing near field communications, it may be desirable that the secure partition be coupled to the near field communications transceiver 40 prior to beginning a transaction. The application 22 in the first virtual processor 20, for example a mobile wallet application, sends a selection of a credit card whose confidential information is located in the second secure partition 34 of the plurality of secure partitions to the application 32 in the trusted security zone. The confidential credit card information may include the credit card number as well as secure credentials for encryption, signature verification, and off-card authentication. The application 32 then couples the second secure partition 34 to the near field communication transceiver 40, and the credit card information stored in the second secure partition 34 will be used in the subsequent mobile financial transaction.

In an embodiment, the system 10 further promotes configuring the secure partition 34 residing in the trusted security zone using Open Mobile Alliance (OMA) standards. The Open Mobile Alliance is a standards body which develops open standards such as specifications for provisioning, device synchronization, device management, instant messaging, and multimedia messaging for the mobile phone industry. Utilizing these same standards and specifications to configure the secure partition 34 provides a known interface and mechanism for over-the-air support of the secure partition 34 for service providers. The Open Mobile Alliance specifications allow secure wireless access to the secure partition 34 by the service provider. Example uses may be changing the configuration of the secure partition 34, provisioning additional secure partitions 34, providing new software and updates to the secure partition 34, and deleting the contents of the secure partition 34 in the event of a lost credit card or closed band account.

Figure 2:
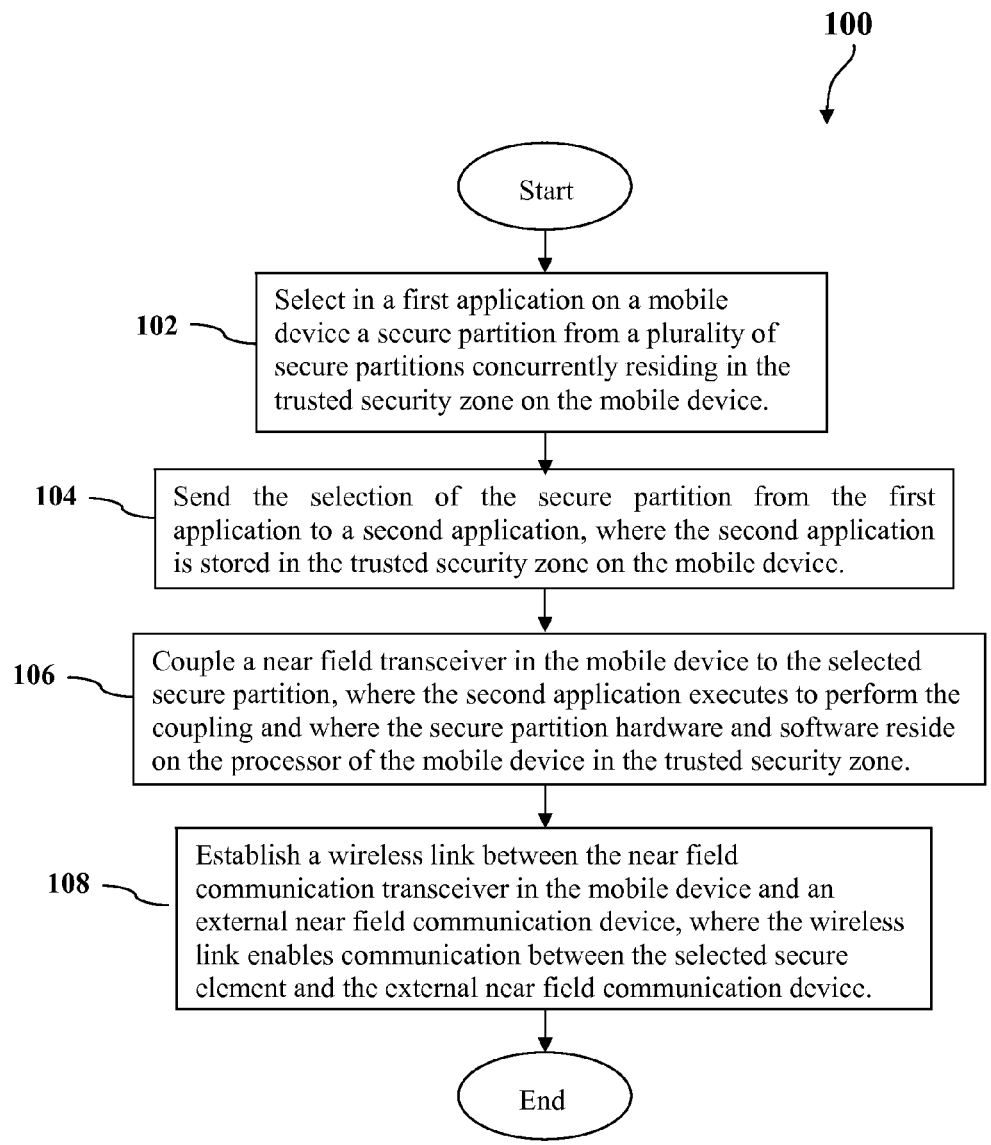
FIG. 2 is a flow chart of a method of secure partition configuration in a trusted security zone on a mobile device according to an embodiment of the disclosure.

Turning now to FIG. 2, a method 100 of secure partition configuration in a trusted security zone on a mobile phone 12 is described. At block 102, a secure partition 34 is selected in a first application 22 on a mobile phone 12 from a plurality of secure partitions 34 concurrently residing in the trusted security zone on the mobile phone. The first application may utilize the selected secure partition 34 to perform its functionality, such as a banking application accessing the secure partition 34 to display balance information to the mobile phone 12 user. At block 104, the selection of the secure partition 34 from the first application 22 is sent to a second application 32, where the second application 32 is stored in the trusted security zone on the mobile phone 12. The second application 32 in the trusted security zone may interface directly with the selected secure partition 34, whereas the first application 22 residing in the normal application space interfaces with the secure partition 34 through other trusted applications.

At block 106, a near field communication transceiver 40 in the mobile phone 12 is coupled to the selected secure partition 34, where the second application 32 executes to perform the coupling and where the secure partition 34 hardware and software reside on the processor 14 of the mobile phone 12 in the trusted security zone. The second application 32 monitors a hardware port on the processor 14 of the mobile phone 12 and sends data received to the selected secure partition 34, thus coupling the selected secure partition 34 to the near field communication transceiver 40. Because the second application 32 resides in the trusted security zone, it can support direct interaction with the secure partitions 34 without impeding the security chain required by mobile financial services standards.

At block 108, a wireless link is established between the near field communication transceiver 40 in the mobile device 12 and an external near field communication device, where the wireless link enables communication between the selected secure partition 34 and the external near field communication device. The coupling of the selected secure partition 34 and the near field communication transceiver 40 in the mobile device 12 allows for the communication path to the external near field communication device. To accommodate the timing specifications for initiating a near field communication session, this coupling is performed prior to establishing the wireless link with the external near field communications device. Once the wireless link is established, communication between the selected secure partition 34 and the external near field communication device is enabled.

In an embodiment, the first application 22 on the mobile phone 12 is an electronic wallet application and the selected secure partition 34 contains credentials which may be used for payments, authentication, and other mobile financial services. An electronic wallet application allows users to make electronic commerce transactions quickly and securely utilizing stored credentials and financial information on the mobile phone 12. The credentials enabling the mobile financial services are stored in the selected secure partition 34 and the electronic wallet application has appropriate access rights to initiate the selection through the second application 32 in the trusted security zone.

In an embodiment, the trusted security zone runs a separate operating system that is not accessible to the mobile phone 12 users. The security of the system is achieved by partitioning the hardware and software resources of the mobile phone so they exist in one of two environments, the secure environment for the security subsystem and the normal environment for everything else. Hardware logic ensures that no secure environment resources can be accessed by the normal environment components. A dedicated secure environment operating system runs in a virtual processor separate from the normal environment operating system in its own virtual processor.

In an embodiment, the second application 32 stored in the trusted security zone is installed in random access memory. Random access memory is memory that loses its data when power is removed and is typically used to store programs and data which are likely to need frequent updates. Using random access memory for the trusted security zone allows the provider to more easily configure and change the programs and data in the trusted security zone while still retaining the security provided by the hardware and software architecture. Hardware logic in the processor 14 ensures users of the mobile phone 12 do not have access to the random access memory in the trusted security zone, helping to ensure the security of the second application 32.

In an embodiment, coupling the near field communication transceiver 40 to the selected secure partition 34 comprises coupling the near field communication transceiver 40 to a hardware port of the processor 14 where the hardware port is monitored by the second application 32 for interfacing with the secure partition 34. The near field communication transceiver 40 is coupled via the Single Wire Protocol (SWP) to a hardware port of the processor 14, which is monitored for data by the second application 32 in the trusted security zone. The second application 32 in the trusted security zone receives the data on the hardware port of the processor 14 and sends it to the selected secure partition 34, which processes the data and responds back through the hardware port to the near field communication transceiver 40 to complete the transaction.

In an embodiment, the plurality of secure partitions 34 residing in the trusted security zone is configured using Open Mobile Alliance (OMA) standards. The Open Mobile Alliance standards allow over-the-air updating of the plurality of secure partitions 34, enabling the mobile device service provider to configure and update the plurality of secure partitions 34 using existing, secure protocols already supported by the mobile phone 12. This over-the-air configuration capability provides the ability for the service provider to manage the usage of the plurality of secure partitions 34 and implement new secure services for their customers.

In an embodiment, the second application 32 enables runtime execution in the trusted security zone based on receiving a signal from the near field communication transceiver 40. Rather than waiting for a request from another program to execute and interface with the secure partition 34, the second application 32 in the trusted security zone executes at startup and continually checks for data on a hardware port of the processor 14. When data from the near field communication transceiver 40 is received on the hardware port, the second application 32 accepts the data and sends it to the secure partition 34 for executing a secure transaction.

Figure 3:
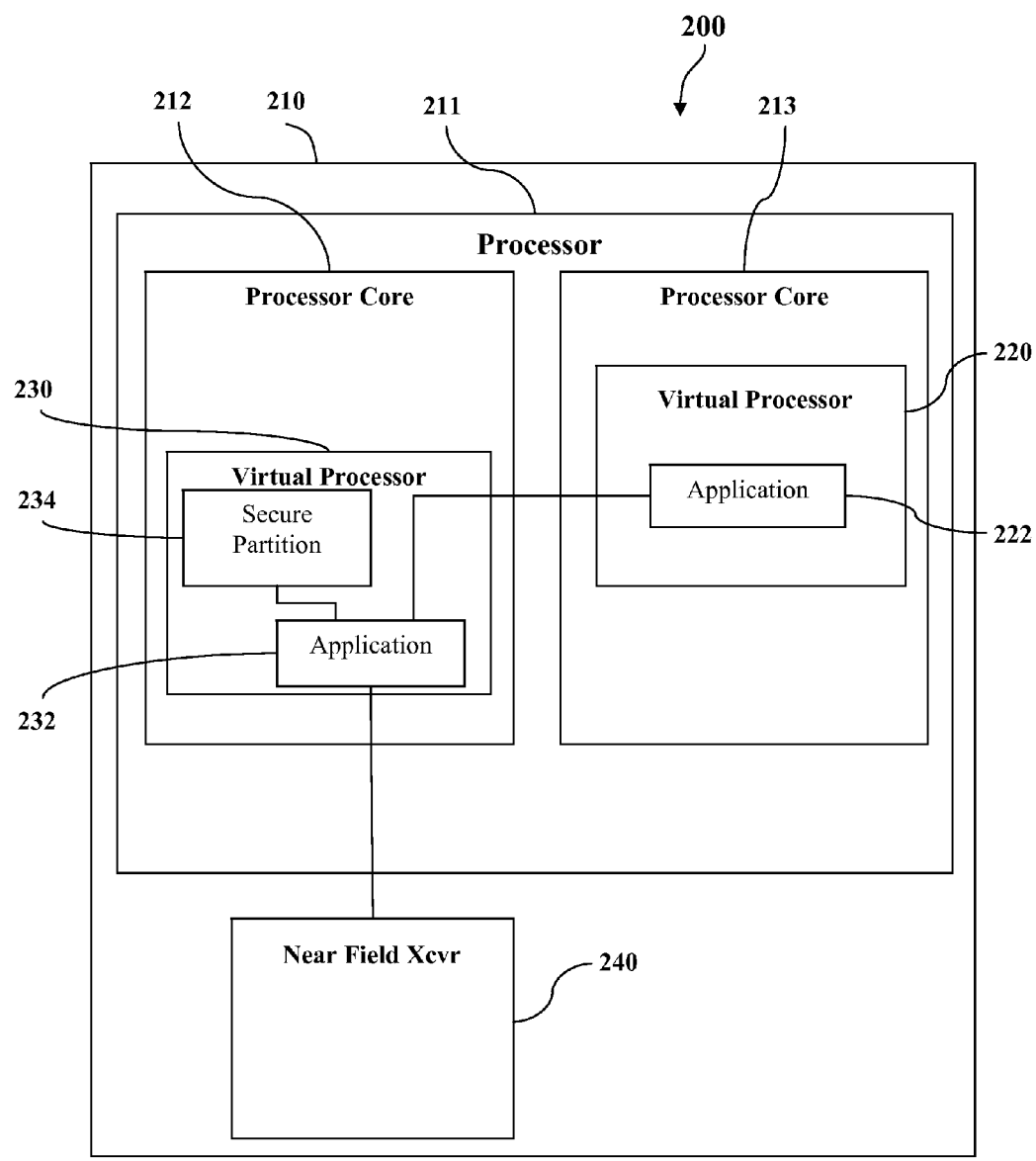
FIG. 3 is a block diagram of a system on a mobile phone for configuring a secure partition in a trusted security zone according to an embodiment of the disclosure.

Turning now to FIG. 3, a system 200 on a mobile phone 210 for configuring a secure partition 234 in a trusted security zone is described. The system 200 comprises a mobile phone 210 comprising a processor 211 and a near field communication transceiver 240. The processor 211 executes virtualization software and comprises a first processing core 212, a second processing core 213, a first virtual processor 220, and a second virtual processor 230, where the second virtual processor 230 comprises the trusted security zone and the secure partition 234 resides in the trusted security zone. The first virtual processor 220 comprises an application 222 which utilizes the secure partition 234 in the trusted security zone. The second virtual processor 230 comprises an application 232 stored in the trusted security zone, where the application 232 is coupled to the near field communication transceiver via the first processing core 212.

The near field communication transceiver 240 allows for secure transactions, data exchange, and wireless connections with other near field communication devices, such as a contactless point-of-sale terminal or identification reader, enabling communication with devices in close proximity. The secure partition 234 comprises data and programs in the trusted security zone designed to protect the data from access by non-secure programs as well as hacking attacks and malware programs. The secure partition 234 may store credentials and data used for mobile financial services, identification documents, and electronic ticketing accessible only to trusted programs stored on the secure partition 234 itself. In an embodiment, the application 232 monitors a hardware port on the first processing core of the plurality of processing cores. When data is received on the hardware port from the near field communication transceiver 240, the application 232 sends the data to the secure partition 234, where the data is processed and communication is sent back to the near field communication transceiver 240 to execute a transaction.

In an embodiment, only the first processing core of the plurality of processing cores is coupled to the near field communication transceiver. Coupling the near field communication transceiver to only the first processing core allows the other processing cores to continue executing normal mobile phone functions while ensuring that the data in the secure partition 234 remains protected. Multiprocessing is the use of two or more processing cores in a single computing system and allows balancing execution across the plurality of cores for greater efficiency. The first processing core would contribute to the execution during normal mobile phone operation, but when performing a wireless link with the near field communication transceiver 240 the first processing core would stop execution of the normal mobile phone functions. The first processing core would then be isolated from the software executing on the other processing cores.

In an embodiment, the first processing core of the plurality of processing cores is coupled to the near field communication transceiver via the Single Wire Protocol. The application 232 in the trusted security zone is coupled to the near field communication transceiver 240 via a hardware port coupled to the first processing core of the plurality of processing cores 212 and sends received data to the secure partition 234. The Single Wire Protocol provides a well-defined, secure interface between the near field communication transceiver and the first processing core of the plurality of processing cores 212.

In an embodiment, the application 232 in the trusted security zone executes on the first processing core 212 of the plurality of cores. Isolating the trusted security zone to the first processing core 212 ensures the security of the data processed by the application 232 by preventing access to the first processing core 212 from outside the trusted security zone. The application 232 in the trusted security zone executes to receive the data on the hardware port of the first processing core from the near field communication transceiver. The application 232 sends the received data to the secure partition 234, where the programs running on the secure partition 234 process the data and reply to complete the transaction. The programs running on the secure partition 234 also execute on the first processing core for isolation from software executing on the other processing cores.

In an embodiment, the first virtual processor 220 is prevented from executing on the first processing core of the plurality of cores when the application 232 in the trusted security zone is executing. During normal mobile phone operation, the first virtual processor 220 uses multiprocessing to execute across the plurality of processing cores 212. When the application 232 in the trusted security zone begins execution, the first processor core is removed from availability to the first virtual processor 220. The virtual processor 220 continues to operate normally using the remaining processing cores of the plurality of processing cores 212.

Figure 4:
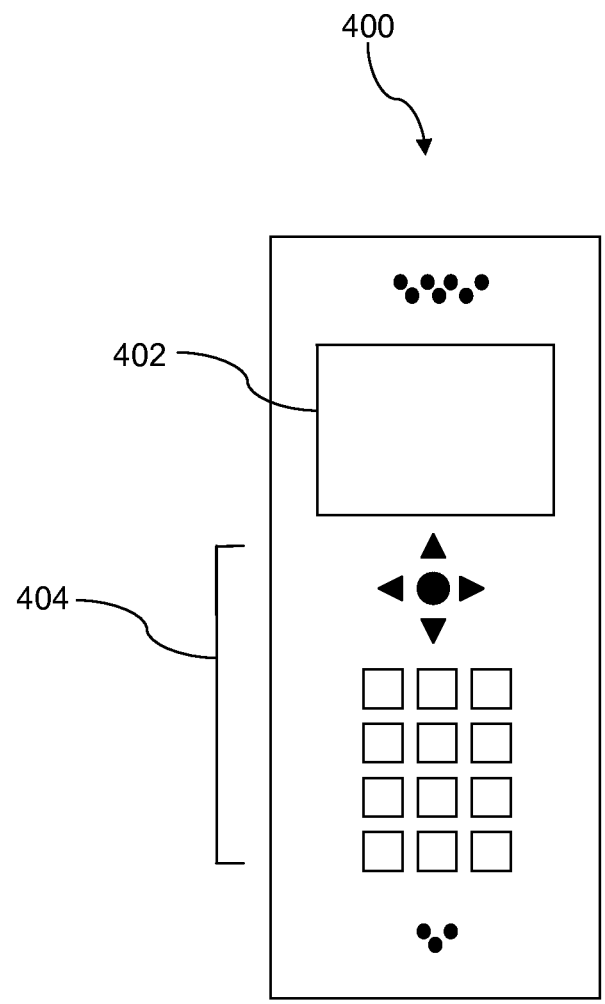
FIG. 4 is an illustration of a mobile device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
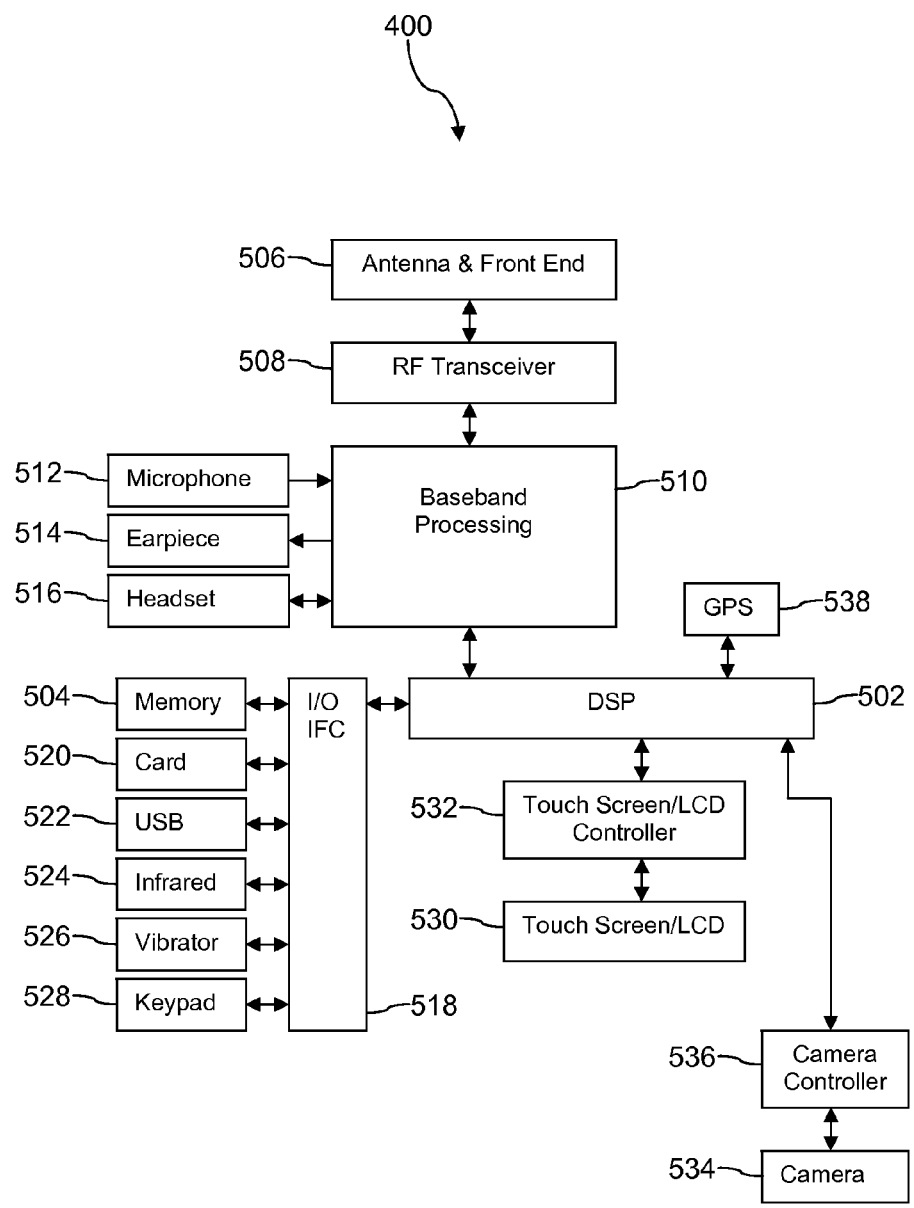
FIG. 5 is a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
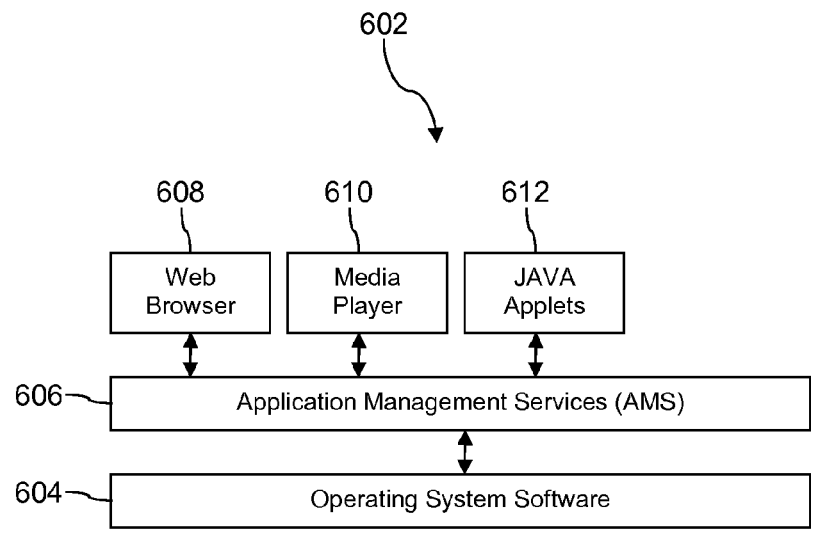
FIG. 6A is a block diagram of a software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
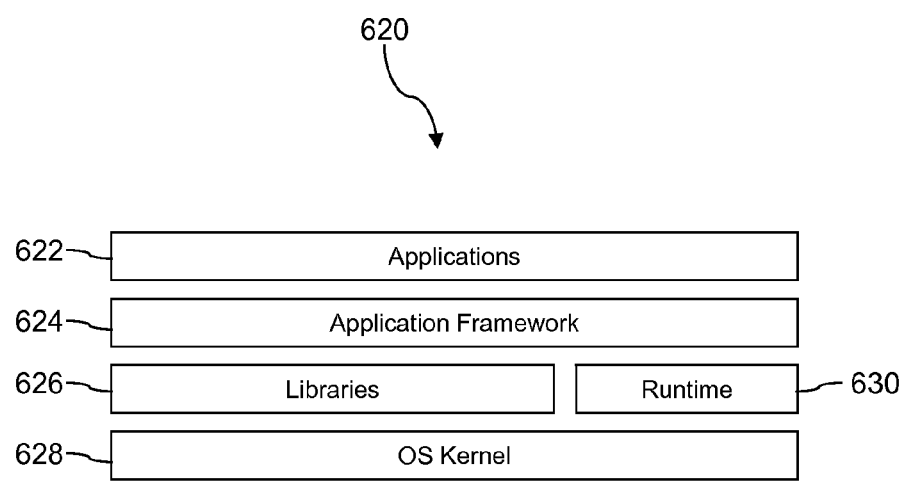
FIG. 6B is a block diagram of a software architecture for a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system on a mobile phone for configuring a secure partition in a trusted security zone, comprising:
   a processor that executes virtualization software and comprises a first virtual processor and a second virtual processor, wherein the second virtual processor comprises the trusted security zone;
   a plurality of secure partitions residing in the trusted security zone, wherein the trusted security zone executes a dedicated operation system;
   a first application stored in the first virtual processor, wherein the first application selects the secure partition from the plurality of secure partitions in the trusted security zone for performing a transaction associated with the first application and sends the selection to a second application stored in the trusted security zone;
   a near field communication transceiver;
   the second application stored in the trusted security zone, wherein the second application receives the selection from the first application and in response to receiving the selection, couples the near field communication transceiver to the secure partition residing in the trusted security zone via direct connection to a hardware port associated with the trusted security zone on the processor prior to beginning the transaction, and wherein the second application enables run-time execution in the trusted security zone based on receiving a signal from the near field communication transceiver; and
   the secure partition residing in the trusted security zone, wherein the secure partition is not directly accessible from the first application.

2. The system of claim 1, wherein the first virtual processor and the second virtual processor execute in a time-sliced fashion comprising switching contexts between the two virtual processors to share processor resources.

3. The system of claim 1, wherein the trusted security zone utilizes security aware components implemented in System on Chip architecture (SoC).

4. The system of claim 1, wherein the near field communication transceiver is coupled to a hardware port of the processor via the Single Wire Protocol (SWP).

5. The system of claim 1, wherein the second application stored in the trusted security zone executes at the ring 0 protection level which provides the most privileges and most direct interaction with the physical hardware.

6. The system of claim 1, wherein the second application stored in the trusted security zone couples the near field communication transceiver to a second secure partition based on receiving a selection of the second secure partition from the first application stored in the first virtual processor.

7. The system of claim 1, further comprising configuring the secure partition residing in the trusted security zone using Open Mobile Alliance (OMA) standards.

8. A method of secure partition configuration in a trusted security zone on a mobile device, comprising:
   selecting in a first application on a mobile device a secure partition from a plurality of secure partitions concurrently residing in the trusted security zone on the mobile device for performing a transaction associated with the first application and sends the selection to a second application stored in the trusted security zone;
   sending the selection of the secure partition from the first application to a second application, wherein the second application is stored in the trusted security zone on the mobile device, and wherein the trusted security zone executes a dedicated operating system;

in response to receiving the selection from the first application, coupling, by the second application, a near field communication transceiver in the mobile device to the selected secure partition prior to performing the transaction, wherein the secure partition hardware and software reside on a processor of the mobile device in the trusted security zone, wherein the secure partition is not directly accessible from the first application, and wherein the coupling is via direct connection to a hardware port associated with the trusted security zone on the processor; and establishing a wireless link between the near field communication transceiver in the mobile device and an external near field communication device, wherein the wireless link enables communication between the selected secure partition and the external near field communication device.

9. The method of claim 8, wherein the first application on the mobile device is an electronic wallet application and the selected secure partition contains credentials which may be used for payments, authentication, and other mobile financial services.

10. The method of claim 8, wherein the trusted security zone runs a separate operating system that is not accessible to the mobile device users.

11. The method of claim 10, wherein the second application stored in the trusted security zone is installed in random access memory.

12. The method of claim 8, wherein the hardware port is monitored by the second application for interfacing with the secure partition.

13. The method of claim 8, further comprising configuring the plurality of secure partitions residing in the trusted security zone using Open Mobile Alliance (OMA) standards.

14. The method of claim 8, wherein the second application enables run-time execution in the trusted security zone based on receiving a signal from the near field communication transceiver.

15. A system on a mobile phone for configuring a secure partition in a trusted security zone, comprising:

a processor that executes virtualization software and comprises a plurality of processing cores, a first virtual processor, and a second virtual processor, wherein the second virtual processor comprises the trusted security zone;

a plurality of secure partitions residing in the trusted security zone, wherein the trusted security zone executes a dedicated operation system;

an application stored in the first virtual processor, wherein the application selects the secure partition from the plurality of secure partitions in the trusted security zone for performing a transaction associated with the application and sends the selection to a second application stored in the trusted security zone;

a near field communication transceiver; and the second application stored in the trusted security zone, wherein the second application receives the selection from the first application and in response to receiving the selection, is coupled to the near field communication transceiver via a first processing core of the plurality of processing cores via direct connection to a hardware port associated with the trusted security zone on the processor prior to beginning the transaction.

16. The method of claim 15, wherein only the first processing core of the plurality of processing cores is coupled to the near field communication transceiver.

17. The method of claim 15, wherein the first processing core of the plurality of processing cores is coupled to the near field communication transceiver via the Single Wire Protocol (SWP).

18. The method of claim 15, wherein the second application in the trusted security zone executes on the first processing core of the plurality of cores.

19. The method of claim 18, wherein the first virtual processor is prevented from executing on the first processing core of the plurality of processing cores when the second application in the trusted security zone is executing.

* * * * *